United States Patent [19]

Lovejoy

[11] 4,107,125

[45] Aug. 15, 1978

[54] CROSSLINKED AROMATIC POLYIMIDES AND ARTICLES MADE THEREFROM

[75] Inventor: Elwyn Raymond Lovejoy, Hockessin, Del.

[73] Assignee: E. I. Du Pont de Nemours and Company, Wilmington, Del.

[21] Appl. No.: 702,356

[22] Filed: Jul. 1, 1976

[51] Int. Cl.² .............................................. C08L 77/00
[52] U.S. Cl. ............................. 260/37 N; 51/298 R; 260/857 PA; 260/857 TW
[58] Field of Search .................. 260/857 PA, 857 PI, 260/857 TW; 261/37 H; 51/298

[56] References Cited

U.S. PATENT DOCUMENTS

| | | | |
|---|---|---|---|
| 3,179,631 | 4/1965 | Endrey | 260/78 TF |
| 3,416,994 | 12/1968 | Chalmers | 260/857 PA |
| 3,533,997 | 10/1970 | Angelo | 260/78 TF |
| 3,554,935 | 1/1971 | Knapp | 260/857 PA |
| 3,621,076 | 11/1971 | De Winter | 260/857 PA |
| 3,632,554 | 1/1972 | Kubota | 260/78 TF |
| 3,781,237 | 12/1973 | Alvino | 260/857 PA |
| 3,897,395 | 7/1975 | D'Alelio | 260/78 TF |

*Primary Examiner*—Paul Lieberman

[57] ABSTRACT

A polyimide polymeric material of a crosslinked combination of two linear aromatic polyimide polymers is disclosed. The crosslinked polyimide polymeric material exhibits a retention of physical properties at high temperatures and finds particular utility as a matrix or binder material in high temperature applications.

12 Claims, No Drawings

CROSSLINKED AROMATIC POLYIMIDES AND ARTICLES MADE THEREFROM

BACKGROUND OF THE INVENTION

1. Field of the Invention

There is a continuing need for polymeric materials exhibiting a retention of physical properties and exhibiting continued strength and toughness over a wide temperature range. This invention relates to crosslinked aromatic polyimide polymeric materials with such qualities. This invention more particularly pertains to such aromatic polyimide polymeric materials made as a crosslinked chemical combination of at least two precursor polyimide resins of certain kind and in certain amount.

As a particular example of one use to which the crosslinked aromatic polyimide is put, this invention also relates to molded, filled articles wherein the crosslinked polyimide is a matrix or binder material for filler particles. More particularly, this invention pertains to such filled articles wherein abrasive filler particles are held by the crosslinked polyimide to yield high speed grinding wheels especially suited for dry grinding operations.

2. Discussion of the Prior Art

Crosslinked polyimide materials are disclosed in U.S. Pat. No. 3,533,997 issued Oct. 13, 1970 on the application of Angelo. Crosslinking is accomplished in those polyimide materials by reacting polyimide polymers with relatively simple polyamine crosslinking compounds. The polyamine crosslinking compounds are disclosed to have a maximum of twenty carbon atoms and polymeric polyamines are not disclosed.

U.S. Pat. No. 3,632,554 issued Jan. 4, 1972 on the application of Kubota discloses a heat resistant polyimide. The polyimide disclosed therein is prepared from two oligomers: one having terminal pairs of carboxyl groups and the other having terminal amine groups. The reaction is between an amine end group and an end group including a pair of carboxyl groups or derivatives of carboxyl groups and the product of the reaction is a linear polyimide.

U.S. Pat. No. 3,897,395 issued July 29, 1975, on the application of D'Alelio discloses the preparation of aromatic polyimide materials using equivalent amounts of oligomeric polyimides. That patent also teaches preparing a mixture including a one-fold molar excess of one of the oligomeric polyimides as a crosslinking agent and then heating the mixture at a temperature of about 300° centigrade.

U.S. Pat. No. 3,179,631 issued Apr. 20, 1965 on the application of Endrey; U.S. Pat. No. 3,718,447 issued Feb. 27, 1973 on the application of Hibbs et al.; and British Pat. No. 1,263,234 published Feb. 9, 1972, all disclose polyimide polymeric materials used as binders for abrasive articles. U.S. Pat. No. 3,179,631 discloses a single, linear, polyimide material prepared from dianhydride and diamine monomers without crosslinking. U.S. Pat. No. 3,718,447 discloses the use of a single thermosetting polyimide prepolymer material which undergoes crosslinking through the action of aliphatically unsaturated imide groups included in the prepolymer. British Pat. No. 1,263,234 discloses a polyimide binder made from a single prepolymer material.

SUMMARY OF THE INVENTION

Industrial requirements for polymeric materials to be used in high temperature, high stress applications have been more or less incompletely met in the past by phenolic compounds and certain polyimides. Such requirements generally include the capability of accepting a filler and remaining strong and tough and adherent to the filler at very high temperatures. One industrial application which exemplifies the above-discussed requirements is in the field of abrasive articles such as grinding wheels. The high temperature requirements of strength, toughness and adherence are particularly important in grinding wheels used in dry grinding operations.

A crosslinked aromatic polyimide polymeric material has been discovered which exhibits improved high temperature characteristics. The polyimide polymeric material of this invention is prepared by a chemical combination of at least two linear, aromatic, coreactant polyimide resins to yield a crosslinked polyimide polymeric material. Each coreactant polyimide resin is selected to have a certain calculated molecular weight and a particular chemical functionality. Additionally, the coreactant resins bear a certain molecular weight relationship to each other and are used within a certain range of mole ratios. Qualities of the crosslinked aromatic polyimide polymeric material of this invention will be demonstrated with reference to grinding wheels tested and used in dry grinding operations.

In aromatic polyimide polymeric material, "aromatic" means that the molecular backbone structure of the polymer consists entirely of aromatic rings and imide rings fused to aromatic rings; provided that aromatic rings can be separated by (i) a group containing one bridging atom, such as,

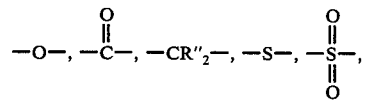

and equivalents thereof wherein R" is hydrogen and alkyl and fluoroalkyl groups of less than five carbon atoms and (ii) either of the following two groups containing two bridging atoms,

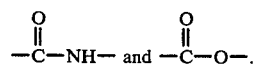

Aromatic rings include benzene, triazine, pyrazine, pyridine, thiazole, naphthalene, and the like.

There is provided, in accordance with the present invention, a crosslinked aromatic polyimide polymeric material comprising a crosslinked chemical combination of a base resin of linear aromatic polyimide polymer and a crosslinker resin of linear aromatic polyimide polymer. The base resin is a polyimide polymer having at least one ketonic carbonyl per repeat unit and the crosslinker resin is a polyimide polymer having amine end-groups. The resins are used in a ratio above 2 and preferably from 6 to 40 moles of crosslinker resin per mole of base resin.

Linear aromatic polyimides are generally prepared from reaction between at least one dianhydride of the structural formula

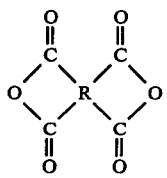

and at least one diamine of the structural formula $H_2N-R'-NH_2$. Linear aromatic polyimides are generally characterized by a repeat unit represented by the structural formula

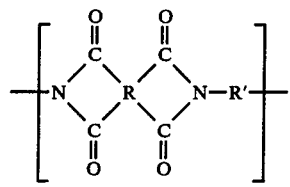

The coreactants and resulting polyimides of the present invention fall within the general structural formulae, above presented, provided that R and R' are aromatic radicals and at least one of R and R' must include at least one ketonic carbonyl group.

It is understood that, in manufacture of linear polyimides, there is a polyamide acid material formed first, a repeat unit of which is represented by the structural formula

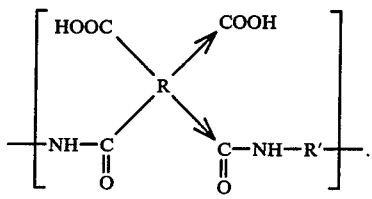

(The arrows denote isomerism). For the purpose of this invention, both of the polyamide acid and the polyimide shall be considered together and referred to as polyimide.

The polyimide polymeric material of the present invention is manufactured as a crosslinked chemical combination of a base resin and a crosslinker resin. The base resin is a linear aromatic polyimide and must include at least one ketonic carbonyl in each repeat unit of the resin molecule. The base resin is prepared from reaction between a dianhydride and a diamine wherein at least one of the monomer reactants includes at least one ketonic carbonyl. Ketonic carbonyl is particularly mentioned to distinguish from other carbonyls such as carboxyl carbonyl, amide carbonyl, and imide carbonyl.

Eligible dianhydrides which contain at least one ketonic carbonyl include: 3,3',4,4'-benzophenonetetracarboxylic dianhydride (BTDA); anhydride of 1,3-bis(3,4-dicarboxybenzoyl)benzene; 3-benzoyl pyromellitic dianhydride; 3,6-dibenzoylpyromellitic dianhydride; and the like.

Eligible dianhydrides which do not contain ketonic carbonyl include: pyromellitic dianhydride (PMDA); naphthalene tetracarboxylic dianhydride; biphenyl tetracarboxylic dianhydride; 2,2-bis(dicarboxyphenyl)propane dianhydride; bis(dicarboxyphenyl)sulfone dianhydride; bis(dicarboxyphenyl)ether dianhydride; 1,1-bis(-dicarboxyphenyl)ethane dianhydride; bis(dicarboxyphenyl)methane dianhydride; and the like.

Eligible diamines which contain at least one ketonic carbonyl include: 4,4'-diaminobenzophenone; benzoyl-4,4'-oxydianiline; and the like.

Eligible diamines which do not contain ketonic carbonyl include: 4,4'-oxydianiline (ODA); metaphenylenediamine; paraphenylenediamine; 4,4'-methylene dianiline; 4,4'-sulfone dianiline; 2,6-naphthalene diamine; 1,3-bis(4-aminophenoxy)benzene; 4,4'-isopropylidene dianiline; and the like.

The molecular weight of polyimide polymers is subject to control in the process for their preparation through the choice of the relative amounts of dianhydride and diamine monomers. Molecular weight can be calculated using the degree of polymerization of the monomers. Where $r$ equals the mole ratio of the monomer type used in the smaller mole amount to the monomer type used in the larger mole amount, the degree of polymerization equals the ratio of $(1 + r)$ to $(1 - r)$. The calculated molecular weight of a polyimide polymeric material equals the sum of (the degree of polymerization times the average molecular weight of a mer unit) plus (the molecular weight of the monomer used in larger mole amount). The average molecular weight of a mer unit is one-half the sum of the molecular weights of the monomers less one mole weight of water. The molecular weight of a polyimide polymer repeat unit is two times the average molecular weight of its mer unit.

Preparation of the base resin is conducted by reacting predetermined amounts of eligible dianhydride and diamine monomers to obtain the desired molecular weight. At least one of the monomers must contain ketonic carbonyl groups. If desired, more than one dianhydride or more than one diamine can be used in making a polyimide resin. Allowance must be made to use the average molecular weight of such a combination of more than one of either monomer. The polyimide preparation can be conducted in accordance with any known process, for example, a solvent system polymerization is disclosed in U.S. Pat. No. 3,179,631 wherein the diamine and the dianhydride are slowly combined, with agitation, in an organic solvent maintaining a temperature of less than about 100° and preferably less than about 50° centigrade. The combined dianhydride and diamine may be a mixed product of polyamide acid and polyimide and the polymer is precipitated by contact with a lower fatty acid anhydride to obtain a linear aromatic polyimide base resin.

Preparation of the crosslinker resin is conducted in the same manner as was described above for the base resin. The crosslinker resin does not require the presence of ketonic carbonyl groups, but the crosslinker resin must be prepared using an excess of diamine to assure amine endgroups. Eligible dianhydrides and diamines are selected from the same groups as are used for the base resin; amounts of each monomer are in accordance with the formula disclosed above to achieve the desired calculated molecular weight; and the reaction is conducted. Polyamide acid is practically completely converted to polyimide to obtain a linear aromatic polyimide crosslinker resin.

The polyimide resins, precipitated from solution under agitating conditions and then dried, are generally in the form of powders having a surface area of at least about 0.1 square meter per gram and a particle size of from about 0.1 to 100 micrometers.

It should be understood that the base resin can have amine end-groups as well as ketonic carbonyl groups; and that the crosslinker resin can have ketonic carbonyl groups as well as amine end-groups. In fact, the base resin and the crosslinker resin can have the same repeat unit with the sole difference between the resins being one of molecular weight.

Molecular weights used herein are calculated molecular weights determined as described previously. The base resin and the crosslinker resin are selected to have different molecular weights and it is preferred that the two resins exhibit a higher to lower molecular weight ratio within a particular range. Either the base resin or the crosslinker resin can have the higher molecular weight in practice of this invention; however, it is preferred that the higher molecular weight material be the base resin. The higher molecular weight resin should exhibit a calculated molecular weight of from 3,000 to 300,000 and the lower molecular weight resin should exhibit a calculated molecular weight of from 500 to 15,000. It has been determined that higher and lower molecular weight resins eligible to be used together should have a ratio of calculated higher and lower molecular weights of from 2 to 50. Thus, if the higher molecular weight resin has a calculated molecular weight of 15,000, the lower molecular weight resin is selected to have a calculated molecular weight of from 500 to 7,500.

The crosslinker resin and the base resin are used in a particular mole ratio relationship to obtain the crosslinked polyimide material of this invention. It has been found that an eligible mole ratio of crosslinker resin to base resin is above 2 and preferably from 6 to 40. Moreover, due to improved qualities of resulting polyimide polymeric material, a preferred mole ratio is from about 15 to 36. Polyimide polymeric material used as binder for the manufacture of grinding wheels to be used in dry grinding operations preferably has a mole ratio of 6 to 40. For best results in the manufacture of grinding wheels to be used in more demanding applications, for example, to be used in dry grinding requiring a high workpiece removal rate, the polyimide polymeric binder material has a mole ratio of 15 to 36.

The polyimide polymeric material of this invention is prepared by performing a crosslinking chemical reaction in a crosslinkable mixture of base resin and crosslinker resin. The base resin and the crosslinker resin, in finely-divided powder form, are substantially homogeneously mixed to yield a crosslinkable polyimide polymeric composition and are molded using heat and pressure to yield the crosslinked polyimide polymeric material of this invention. The molding process generally includes steps of mixing, compacting and heating the coreactant resin powders. The steps of compacting and heating can be performed simultaneously.

The coreactant resin powders must be substantially homogeneously mixed to afford maximum opportunity for base resin particles and crosslinker resin particles to contact and react during the compacting and heating steps. All of the resin particles should have a size of from about 0.1 to 100 micrometers. In the manufacture of grinding wheels, it is preferred that the resin particles have a particle size of from about 1.0 to 50 micrometers.

Compacting of the crosslinkable polyimide polymeric composition is generally conducted by some combination of heat and pressure. While compacting processes are well known and variations thereon are several, two exemplary and preferred compacting procedures for the coreacting materials of this invention are as follow:

(I) A crosslinkable polyimide polymeric composition to be molded is placed in a mold and is compacted at about 400 to 420° centigrade at about 35 megapascals (5,000 pounds per square inch) for about 15 to 25 minutes.

(II) A crosslinkable polyimide polymeric composition to be molded is placed in a mold and is compacted at ambient temperature at 690 megapascals (100,000 pounds per square inch) for about ten seconds.

The crosslinkable polyimide polymeric composition is subjected to a heat treatment which results in a crosslinked polyimide polymeric material of this invention. The preferred heat treatment for preparing crosslinked polyimide of the present invention includes subjecting the compacted crosslinkable composition to a temperature of 350 to 450° centigrade for about 1 to 100 hours. Preferably, the material can be subjected to a temperature of about 375 to 450° centigrade for from 1 to 24 hours. One exemplary heating step schedule includes heating at about 400° centigrade for three hours, followed by heating for one additional hour at about 425 to 435° centigrade. It should be understood that higher heating temperatures permit shorter heating times.

Abrasive articles, such as grinding wheels, made using the crosslinked polyimide of this invention as the binder or matrix material, exhibit improved thermal and oxidative stability as compared with wheels of the prior art using, as the binder, phenolic material or crosslinked polyimide material containing aliphatic structures; or crosslinked aromatic polyimide material made from a single polymeric structure. In dry grinding operations, grinding wheels using the crosslinked polyimide of this invention last longer, generate less heat, suffer less smearing, consume less energy, and are more resistant to loading than grinding wheels previously known. Such grinding wheels also exhibit advantages in wet grinding operations.

Filler materials other than abrasive particles can be used to manufacture filled articles with a binder of the crosslinked polyimide of this invention. Filler particles can be used which increase the directional strength of the binder material or alter the coefficient of friction between the filled article and another article. Such filler particles include: glass fibers, steel or bronze wool, silica, mica, carbon, metallic oxides, or fibers produced from organic polymeric materials such as polytetrafluoroethylene, and the like.

Filler particles can be used which increase heat conductivity or electrical conductivity, such as silicon carbide, carbon and carbon black, alumina, metal particles, either pure or in alloy form, and the like. Filler particles can be used which serve as lubricants, such as molybdenum disulfide, graphite, lead sulfide, boron nitride, polytetrafluoroethylene and the like. Abrasive filler particles include diamond, alumina, silicon carbide, boron nitride, and the like. The abrasive filler particles can be coated by a thin layer of metallic coating, if desired, to enhance adhesion to the binder material.

Filler particles, in general, can represent from 5 to 95 percent, by volume, of a filled article. Abrasive articles, particularly grinding wheels, can be from 10 to 75 percent, by volume, filler particles. While it is understood that filled articles can be made which utilize filler particles of a wide variety of sizes, abrasive articles generally utilize abrasive filler particles of from about 25 to 200 micrometers in average diameter, to best advantage.

Neither the size nor the total volume of filler particles should be so great that the filler particles interfere with the matrix quality of the crosslinked polyimide polymeric material in holding a filled article together.

Other filled articles eligible for manufacture using the crosslinked polyimide polymeric material of this invention include brake and clutch linings, bearings, bushings, and the like.

weight percent tungsten carbide and 6 weight percent cobalt. Test conditions are as follow:

| Test Number | Wheel Speed (RPM) | Infeed (mm/pass) | Table Speed (cm/min) | Grinding Machine |
|---|---|---|---|---|
| 1 | 3,900 | 0.025 | hand controlled | Cincinnati #1 |
| 2 | 5,800 | 0.050 | hand controlled | Cincinnati #2 |
| 3 | 3,900 then | 0.025 0.050 | for 250 passes ) for 125 passes- ) hand controlled) | Cincinnati #2 |
| 4 | 3,760 | 0.041 | 200 | Walter 2-C |
| 5 | 3,900 | 0.025 | for 500 passes ) controlled to yield) removal of 20 cm³/hour | Cincannati #2 |

Cincinnati #1 and Cincinnati #2 are model designations for grinding machines sold by Cincinnati Millicron Company, Cincinnati, Ohio. Walter 2-C is a model designation for a grinding machine sold by Montawerke Walter, GmbH, Tuebingen, West Germany.

Grinding wheel test results — Results of the grinding tests are reported as the grinding ratio of a test grinding wheel. The grinding ratio of a wheel is the ratio of the volume of workpiece abraded away during the test, divided by the volume of grinding wheel lost or abraded away during the test. In these tests, using tungsten carbide workpieces in dry grinding operation, a grinding ratio of greater than about ten to fifteen indicates a reasonably good grinding wheel. Commercially available grinding wheels having a phenolic binder and sold for dry grinding operation generally exhibit grinding ratios of less than about fifteen under conditions of the tests herein. Commercially available grinding wheels having conventional polyimide binders smear and quickly become non-cutting under dry grinding conditions such that grinding ratios are low and difficult to determine. Even grinding wheels made from a single polymer of crosslinked aromatic polyimide generate much heat and cut with difficulty and are generally poorer in dry-grinding performance than wheels with phenolic binder. The grinding wheels of this invention exhibit grinding ratios of greater than 15 and generally greater than 20.

DESCRIPTION OF THE PREFERRED EMBODIMENTS

Following are several descriptions of the preparation of crosslinked aromatic polyimide polymeric material of this invention. Also included are descriptions of a use of that polyimide polymeric material as the binder or matrix material in the manufacture of grinding wheels and the subsequent operation and comparison of such grinding wheels with presently commercially available grinding wheels. Unless otherwise indicated, temperatures are in centigrade units and percentages are by volume. Heating steps are conducted in an inert atmosphere.

Preparation of coreactant resins — To prepare base resins and crosslinker resins, 4,4'-oxydianiline (ODA) and 3,3',4,4'-benzophenone tetracarboxylic dianhydride (BTDA) or pyromellitic dianhydride (PMDA) are reacted together in appropriate amounts to yield linear aromatic polyamide acid which is converted to polyimide powder having the following characteristics:

| Resin | Monomer Mole Ratio | Calculated Molecular Weight |
|---|---|---|
| I | 2/1 ODA/BTDA | 929 |
| II | 100/103 ODA/BTDA | 16,272 |
| III | 115/100 ODA/BTDA | 3,700 |
| IV | 110/100 ODA/BTDA | 5,230 |
| V | 125/100 ODA/PMDA | 1,919 |

The above resins are used in examples below to make crosslinked aromatic polyimide material tested as to certain qualities by being molded into grinding wheels and used to abrade specified workpieces under a variety of predetermined dry grinding conditions.

Grinding wheel manufacture — grinding wheels are manufactured by preparing a substantially homogeneous mixture of crosslinkable polyimide composition (base resin powder and crosslinker resin powder) and filler particles and molding the mixture to the desired shape. For purposes of the tests in examples which follow, grinding rims are made for wheels which are known, in the trade, as D11V9 cup-style and which are 9.53 cm × 3.8 cm × 3.16 cm (3¾ × 1½ × 1¼inches).

Grinding wheel testing — The grinding wheels are tested in dry grinding operation on commercial grinding machines using tungsten carbide workpiece material designated as "C-2" tungsten carbide and containing 94

EXAMPLE 1

In this example, coreactant resins I and II are mixed in weight proportions of 4.08 and 5.92, respectively, to yield a mole ratio of 12.1. As a preliminary experiment, a chip of the crosslinkable polyimide composition is compacted in a mold at a temperature of about 410 degrees and a pressure of 35 megapascals (5,000 pounds per square inch) for 20 minutes. The chip has a glass transition temperature of about 285 degrees and is not crosslinked. The chip is then heated at about 400 degrees for about three hours to complete the molding and to accomplish the crosslinking reaction. As a result of that heating step the glass transition temperature is increased to about 322 degrees, indicating that crosslinking has occurred. Glass transition temperatures are determined by thermomechanical analysis.

A second chip is made and compacted at about 390° under the same pressure and for the same time as above. The glass transition temperature is only about 212 degrees due to the decreased compacting temperature. A heat treatment at 400° for about three hours results in a crosslinked polyimide material with a glass transition temperature of about 329°.

To prepare a crosslinkable polyimide composition for making a grinding wheel, the same mixture of base and crosslinker resins is combined with 150 grit(88 to 105 micrometers particle size) copper-coated diamonds and 220 grit (62 to 74 micrometers particle size) silicon carbide in proportion to yield a molded abrasive grinding wheel rim containing 17 percent diamonds, 8 percent copper coating, 30 percent silicon carbide, and 45 percent coreactant resin mixture. The rim is compacted in a mold at about 410 degrees under pressure of 35 megapascals (5,000 pounds per square inch) for about 20 minutes. The compacted rim is then removed from the mold, allowed to cool, and heated to about 400° at a rate of about 1.8° per minute. The temperature of 400° is maintained for about three hours. The rim is affixed to an aluminum core and tested in accordance with the conditions of test number 1, yielding a grinding ratio of 1.8.

The wheel, rim and core, is exposed to an additional heat treatment of 435° for about 1 hour to increase crosslinking. The wheel, retested according to test number 1, is then found to have a grinding ratio of 17.9.

EXAMPLE 2

A crosslinkable polyimide composition is made identically with that of Example 1 with the exception that 600 grit (less than 35 micrometers particle size) silicon carbide is used. A rim is compacted at about 25 degrees under a pressure of about 690 megapascals (100,000 pounds per square inch) for about 10 seconds. The rim is removed from the mold and heated at a rate of about 1.8 degrees per minute to 400° where the temperature is maintained for about 3 hours. The rim is then further heated, at about the same rate, to about 427° and that temperature is maintained for about one hour. The grinding wheel made in this example is free-cutting and exhibits a grinding ratio of 29.0 when tested in accordance with conditions of test number 2 and 22.4 when tested in accordance with conditions of test number 3. A commercially available phenolic bonded grinding wheel with a similar abrasive composition (such as a grinding wheel sold by The Norton Company bearing the designation "B-56") exhibits grinding ratios of 7.0 and 5.4 when tested under the conditions of tests number 2 and 3, respectively.

EXAMPLE 3

A rim is prepared using the same crosslinkable polyimide base resin and crosslinker resin as is used in Example 2 and having a total composition of 25 percent diamond, 11.5 percent copper-coating, 5 percent molybdenum disulfide, 17 percent silicon carbide and 41.5 percent coreactant resin mixture. The molybdenum disulfide is coated with one of the resins. The compacting and heating procedure is the same as for Example 2, above. A grinding ratio of 29.6 is determined for this wheel using testing procedure number 2 and the testing procedure number 3 yields a grinding ratio of 17.4. The wheel of this example is free-cutting.

EXAMPLE 4

A crosslinkable polyimide composition is made, using a mixture of 8.50 weight parts of resin III and 1.50 weight parts of resin II, to give a total molded composition of 17 percent diamonds, 8 percent copper coating, 30 percent silicon carbide, 5 percent molybdenum disulfide and 40 percent base and crosslinker resin mixture. The mole ratio of the coreactant resins (III/II) is 24.9.

Rims are compacted and molded in the same manner as described in Example 2 above and test procedure number 3 is used at a variety of workpiece abrading or removal rates. Results of those tests are as follow:

| Workpeice Removal Rate | | Grinding Ratio |
|---|---|---|
| (cm³/hour) | (in³/hour) | |
| 20 | 1.2 | 37.2 |
| 31 | 1.9 | 16.9, 14.7 |
| 34 | 2.1 | 19.4, 18.6 |
| 39 | 2.4 | 19.2, 5.2 |

EXAMPLE 5

In this example, the crosslinked polyimide grinding wheels of Examples 2 and 3 are retested. Under the test procedure number 4, the temperature of the workpiece and the peak power drawn are determined in addition to the grinding ratio. A comparison is made, in this example, with a commercially available phenolic grinding wheel having similar abrasive composition and sold by Ernst Winter and Sohn, GmbH Hamburg, West Germany under the trade designation "K+888". Test results are as follows:

| Grinding Wheel | Workpiece Temperature | Peak Power Drawn (Watts) | Grinding Ratio |
|---|---|---|---|
| Example 2 | 182 | 1,065 | 13.7 |
| Example 3 | 156 | 1,025 | 17.6 |
| Phenolic Wheel | 158 | 1,371 | 9.3 |

EXAMPLE 6

A crosslinkable polyimide composition is made using a mixture of 4.76 weight parts of resin V and 5.24 weight parts of resin IV along with the fillers of EXAMPLE 1 is like kind and amount. The mole ratio (V/IV) of the coreactant resins is 2.48. Rims are compacted and molded in the same manner as described in Example 2 above; and test procedure number 3 is used to determine the grinding ratio of that wheel and a commercially available grinding wheel having similar abrasive content and a phenolic binder (the same wheel as identified in Example 2 as sold by The Norton Co.) The crosslinked polyimide wheel exhibits a grinding ratio of 25.6 compared with a grinding ratio of 14.4 for the phenolic wheel.

EXAMPLE 7

Crosslinkable polyimide compositions are made using mixtures of resin III and resin II to yield a series of five different mole ratios of coreactant resins. The mixtures are combined with fillers and the resulting compositions are molded into rims as in Example 2. Test procedure number 5 is employed to determine grinding ratios for the several rims. The commercially available phenolic grinding wheel identified in Example 2 as sold by The Norton Company is determined to have a grinding ratio of 19.5 under the same test conditions. Results of the test are as follows:

| Percent Component | Grinding Wheel | | | | |
|---|---|---|---|---|---|
| | (i) | (ii) | (iii) | (iv) | (v) |
| Diamonds (88 to 105 μm) | 17 | 17 | 17 | 17 | 17 |
| Copper coating | 8 | 8 | 8 | 8 | 8 |
| Silicon carbide | | | | | |

|  | Grinding Wheel | | | | |
|---|---|---|---|---|---|
| Percent Component | (i) | (ii) | (iii) | (iv) | (v) |
| coated with resin III | 30 | 30 | 30 | 30 | 30 |
| Molybdenum sulfide coated with resin II | 5 | 5 | 5 | 4.2 | 3.7 |
| Resin Binder | 40 | 40 | 40 | 40.8 | 41.3 |
| Mole Ratio | | | | | |
| Resin III/II | 6.6 | 13.2 | 24.9 | 29.4 | 34.4 |
| Grinding Ratio | 40.6 | 59.0 | 70.0 | 40.2 | 31.9 |

The grinding wheels of this example generate less heat, sound and flame than the phenolic control wheel. At a greater workpiece removal rate, the phenolic control wheel burns the workpiece causing a color change, while wheels of this example can be used without damaging the workpiece. The wheel designated as (iv) above, is preferred for greater workpiece removal rates.

What is claimed is:

1. A polyimide polymeric material comprising a crosslinked chemical combination of
    (a) a higher molecular weight base resin of linear aromatic polyimide polymer having at least one ketonic carbonyl per repeat unit and a molecular weight of from 3,000 to 300,000 and
    (b) a lower molecular weight crosslinker resin of linear aromatic polyimide polymer having amine end-groups and a molecular weight of from 500 to 15,000; wherein the mole ratio of crosslinker resin to base resin is in a range of from greater than 2 to 40 and wherein the molecular weight ratio of higher molecular weight resin to lower molecular weight resin is from 2 to 50.

2. The polyimide polymeric material of claim 1 wherein the mole ratio of crosslinker resin to base resin is in a range of from 6 to 40.

3. The polyimide polymeric material of claim 1 wherein the mole ratio of crosslinker resin to base resin is in a range of from 15 to 36.

4. A crosslinkable polyimide polymeric composition comprising a substantially homogeneous mixture of minute particles of
    (a) a higher molecular weight base resin of linear aromatic polyimide polymer having at least one ketonic carbonyl per repeat unit and a molecular weight of from 3,000 to 300,000 and
    (b) a lower molecular weight crosslinker resin of linear aromatic polyimide polymer having amine end-groups and a molecular weight of from 500 to 15,000; wherein the mole ratio of crosslinker resin to base resin is in the range of from greater than 2 to 40.

5. The composition of claim 4 wherein the minute particles have a size substantially within the range of 0.1 to 100 micrometers.

6. A filled article comprising a multitude of minute filler particles substantially homogeneously distributed throughout a matrix of the polyimide polymeric material of claim 1.

7. The filled article of claim 6 wherein the filler particles comprise diamonds.

8. The filled article of claim 7 shaped as an abrasive wheel.

9. A process for making crosslinked polyimide polymeric material comprising the steps of
    (i) mixing minute particles of (a) a higher molecular weight base resin of linear aromatic polyimide polymer having at least one ketonic carbonyl per repeat unit and a molecular weight of from 3,000 to 300,000 and (b) a lower molecular weight crosslinker resin of linear aromatic polyimide polymer having amine end-groups and a molecular weight of from 500 to 15,000; wherein the mole ratio of crosslinker resin to base resin is in the range of from greater than 2 to 40.
    (ii) compacting the mixture of minute particles; and
    (iii) heating the mixture at from 375 to 450 degree centigrade for from 1 to 24 hours.

10. The process of claim 9 wherein the mole ratio of crosslinker resin to base resin is in a range of from greater than 2 to 40.

11. The process of claim 9 wherein the base resin and the crosslinker resin have different molecular weights and wherein the ratio of higher molecular weight to lower molecular weight is from 2 to 50.

12. The process of claim 11 wherein the mole ratio of crosslinker resin to base resin is in a range of from 6 to 40.

* * * * *

Disclaimer 4,107,125.—*Elwyn R. Lovejoy*, Hockessin, Del. CROSSLINKED AROMATIC POLYIMIDES AND ARTICLES MADE THEREFROM. Patent dated Aug. 15, 1978. Disclaimer filed Feb. 17, 1984, by the assignee, *E. I. Du Pont De Nemours and Co.*

Hereby enters this disclaimer to claims 7 and 8 of said patent.

[*Official Gazette April 17, 1984.*]